United States Patent [19]
Oh

[11] Patent Number: 5,992,774
[45] Date of Patent: Nov. 30, 1999

[54] METHOD AND SYSTEM FOR RECYCLING CONSTRUCTION WASTE ARTICLES

[75] Inventor: Jong-Taek Oh, Kwangmyong, Rep. of Korea

[73] Assignee: Insun Company, Ltd., Kyongsangnam-Do, Rep. of Korea

[21] Appl. No.: 09/039,458

[22] Filed: Mar. 16, 1998

[51] Int. Cl.⁶ .............................. B02C 1/00; B02B 5/02; B03B 9/04; B03C 1/30

[52] U.S. Cl. ............. 241/20; 241/24.12; 241/24.14; 241/24.15; 241/29; 241/152.1; 241/152.2; 241/DIG. 38; 209/3; 209/12.1; 209/17; 209/38; 209/39; 209/930

[58] Field of Search .................... 209/3, 12.1, 17, 209/38, 39, 930; 241/24.12, 24.14, 24.15, 152.1, 152.2, 186.35, DIG. 38, 20

[56] References Cited

U.S. PATENT DOCUMENTS

| | | | |
|---|---|---|---|
| 4,813,618 | 3/1989 | Cullom | 241/DIG. 38 |
| 5,333,738 | 8/1994 | Fuchs et al. | 209/38 |
| 5,465,847 | 11/1995 | Gilmore | 209/12.1 |

*Primary Examiner*—Donald P. Walsh
*Assistant Examiner*—Brett C. Martin
*Attorney, Agent, or Firm*—Staas & Halsey

[57] ABSTRACT

A method and system for recycling construction waste articles is disclosed. In the method and system of this invention, construction waste articles are crushed into primary pieces of not larger than 200 mm in size. The primary pieces are screened into aggregate of not smaller than 40 mm in size and earth and sand. The aggregate is washed in a water tank using a water jetting and aeration effect with any floating materials floating on water. The washed aggregate is separated from water using a screen prior to being crushed into final pieces having sizes of 45–75 mm. The final pieces are divided into standard aggregate of not larger than 25 mm in size and substandard aggregate of larger than 25 mm in size. The substandard aggregate is returned to a cone crusher so as to be recrushed.

2 Claims, 5 Drawing Sheets

METHOD AND SYSTEM FOR RECYCLING CONSTRUCTION WASTE ARTICLES

TECHNICAL FIELD

The present invention relates, in general, to a recycling treatment for construction waste articles, such as earth, sand, waste brick, waste concrete, waste wood and waste asphalt produced from building or public works, and, more particularly, to a method and system used for treating and recycling construction waste articles having an affinity for environment, thus effectively conserving resources and effectively preventing environmental pollution caused by such waste articles.

BACKGROUND ART

Most developing countries politically drive forward industrial development and rapid growth with little thought for the protection of the environment, thus resulting in environmental disruption. In most countries with developed architectural and public civilization, reconstruction produces rebuilding waste articles, such as earth, sand, waste brick, waste concrete, waste wood and waste asphalt which have to be effectively treated and recycled, thereby conserving resources and protecting the environment.

Therefore, it is time to provide measures to effectively treat such waste articles and pollutants, produced in countries driving forward a high-growth policy.

Particularly, the amount of construction waste articles, produced from building or public works, is rapidly increased in most countries since some urban or local areas in such countries include superannuated buildings, which compromise the safety of residents and fail to meet newly required residential functions, thus needing reconstruction.

As well known to those skilled in the art, construction waste articles typically include various materials such as earth, sand, pebbles, stones, waste brick, waste concrete, waste wood, waste asphalt and sludge. A characteristic of such construction waste articles is that the articles have an inorganic composition which is not harmful to the human body. However, due to the various materials included among construction waste articles, it is somewhat difficult to effectively treat and recycle the waste articles. Such difficulty in treatment for the construction waste articles is a cause of the indifference of most governments and companies toward the recycling of such waste articles.

The indifference of the governments and companies toward the recycling of construction waste articles results in waste of resources and reduction in quality of recycled articles which have been reutilized in some way. In this regard, such construction waste articles are just used as a material for raising the ground or reclaiming land and it is a matter of regret.

Therefore, it is necessary to actively strive for the appropriate treatment and recycling of such construction waste articles in an effort to achieve the protection of the environment, the conservation of resources and the reduction in construction expenses.

In order to meet the above necessity, some countries make or improve related laws and regulations in such a way to force related industries to recycle construction waste articles and provide various systems for recycling such waste articles.

Such an obligation to recycle construction waste articles results in the development of various systems capable of partially or totally processing such waste articles so as to reutilize the waste articles.

As an example of known systems for recycling construction waste articles, movable crushers, capable of recycling the waste articles, are used at building or public works. However, such known movable crushers are problematic in that they can not effectively treat the waste articles, including various materials, and fail to provide a desired quality of recycled articles.

Another problem of the above crushers is that the crushers are similarly designed and manufactured while disregarding the different characteristics of construction waste articles to be treated by the crushers. The operational effect of such crushers is thus reduced and this limits use of the crushers.

Korean Utility Model Publication 94-4771 discloses a system for treating and recycling waste articles. In the above Korean system, waste articles fall by their weight while being processed at a plurality of steps of, for example, dividing the falling articles into metals and nonmetals, cutting the metals and nonmetals into pieces and collecting earth or dust from the pieces, thus more effectively collecting usable articles and conserving resources.

In order to accomplish the above-mentioned operational effect, the Korean system comprises a waste inlet opening, a first conveyor, a first roller crusher, a first magnetic conveyor, a cutter, a first screen, a second roller crusher, a second conveyor, a second magnetic conveyor, a second screen and a third conveyor (a horizontal conveyor) which are arranged in order. The system also has an inclined frame with the waste inlet opening being formed at the top portion of the frame. The first roller crusher comprises a set of shafted rollers of which the outer surfaces are uneven, thus crushing the waste articles. The first magnetic conveyor comprises a electromagnetic roller, a nonconductive/nonmagnetic roller and a cylindrical pipe. The cutter comprises two blades: a fixed blade and a movable blade.

Japanese Patent Publication No. Hei. 5-21632 discloses a waste article treatment system. This Japanese system comprises a press and a crusher which are respectively used for compressing and crushing waste articles. The above system also includes a separator and a furnace. The separator is for dividing the compressed and crushed waste articles into classes, while the furnace is for melting the grouped articles prior to forming the melted articles into determined shapes using molds. The formed articles are, thereafter, discharged from the system by a conveyor belt. Another example of the typical waste article treatment is referred to in Japanese Patent Publication No. Hei. 6-30755 which discloses a method and system for recycling waste concrete. The method and system disclosed in the above Japanese patent is for crushing waste concrete into pieces having a size suitable for allowing the concrete pieces to be usable. In the operation of the above system, waste concrete is crushed into pieces by a cylindrical drum. The drum has a plurality of crushing protrusions on the internal surface and is eccentrically rotatable by a motor. Crushed pieces, having a predetermined size, fall onto a conveyor belt by their weight prior to being discharged from the system. Meanwhile, the other pieces and powders, which are non-standardized, are fed to intermediate steps through another conveyor belt, which is arranged at the top portion of the drum. The non-standardized pieces and powders are processed at the intermediate steps and are discharged from the system. On the other hand, finely ground powders are processed at a retreating step and are classified into groups prior to being appropriately reutilized.

However, the typical methods and systems for treating and recycling construction waste articles fail to effectively classify the waste articles, thus regrettably reducing quality of recycled articles. The operational effect of the known recycling systems is too low to be generally used in various industrial fields.

In addition, a system for recycling waste articles including dredged mud is proposed and used at various industrial fields.

The above system continuously processes waste articles, including dredged mud, at a plurality of steps: a crushing step, a selecting step and a washing step, thus collecting usable articles. However, the system is problematic in that it fails to effectively or automatically select useless materials from the waste articles due to a defect in the mechanism or the arrangement of the system's parts. Such a defect also causes both a screen and a conveyor belt to often break down during the operation of the system and results in contamination of water used in the washing step, thus forcing the water to be treated through a complex process.

Another problem experienced in the above system is that a rotatable drum, used as a selector for selecting useless materials from the waste articles, easily catches vinyl pieces, fabric pieces or synthetic resin pieces. It is thus necessary to burn such articles, caught by the selector, using a torch lamp. The above system may use a blowing effect for selecting useless materials from the waste articles on the conveyor belt. That is, a blower may be arranged at a position under the outlet end of the conveyor belt and blow around the articles dropped from the outlet end of the conveyor belt, thus selecting the useless materials by specific weight of the materials. However, such a blower fails to effectively select the useless materials since the waste articles form a curtain when they are dropped from the outlet end of the conveyor belt.

In this regard, the selection of useless materials from the waste articles on the conveyor belt has to be manually performed. That is, the useless materials have to be manually selected by many workers standing around the conveyor belt. In such a case, a water tank is added to the system and supplies water to the conveyor belt, thus washing the waste articles on the conveyor belt.

In the above system, waste articles may be double processed. That is, the waste articles may be subjected to primary and secondary processes individually including a crushing step, a selecting step and a washing step. After the secondary process, the recycled articles are discharged from the system through a vertical discharging method. However, since construction waste articles typically include various useless materials, such as wood, paper, plastic materials, vinyl pieces, synthetic resin materials and styrofoam pieces, the process of recycling such construction waste articles exceedingly wastes time and labor and fails to provide high quality recycled articles.

As well known to those skilled in the art, waste concrete amounts to at least 30% of all construction waste articles.

For example, Korea, a developing country, generates about $10^7$ tons ($43 \times 10^5$ m$^3$) of waste concrete, about $7 \times 10^6$ tons of waste asphalt concrete, about $58 \times 10^5$ tons of construction sludge, about $3 \times 10^6$ of waste wood and about $58 \times 10^5$ tons of mixed waste articles for a year.

According to the above statistics, it is noted that waste concrete accounts for at least ⅓ of all construction waste articles generated in Korea.

Figure 1:
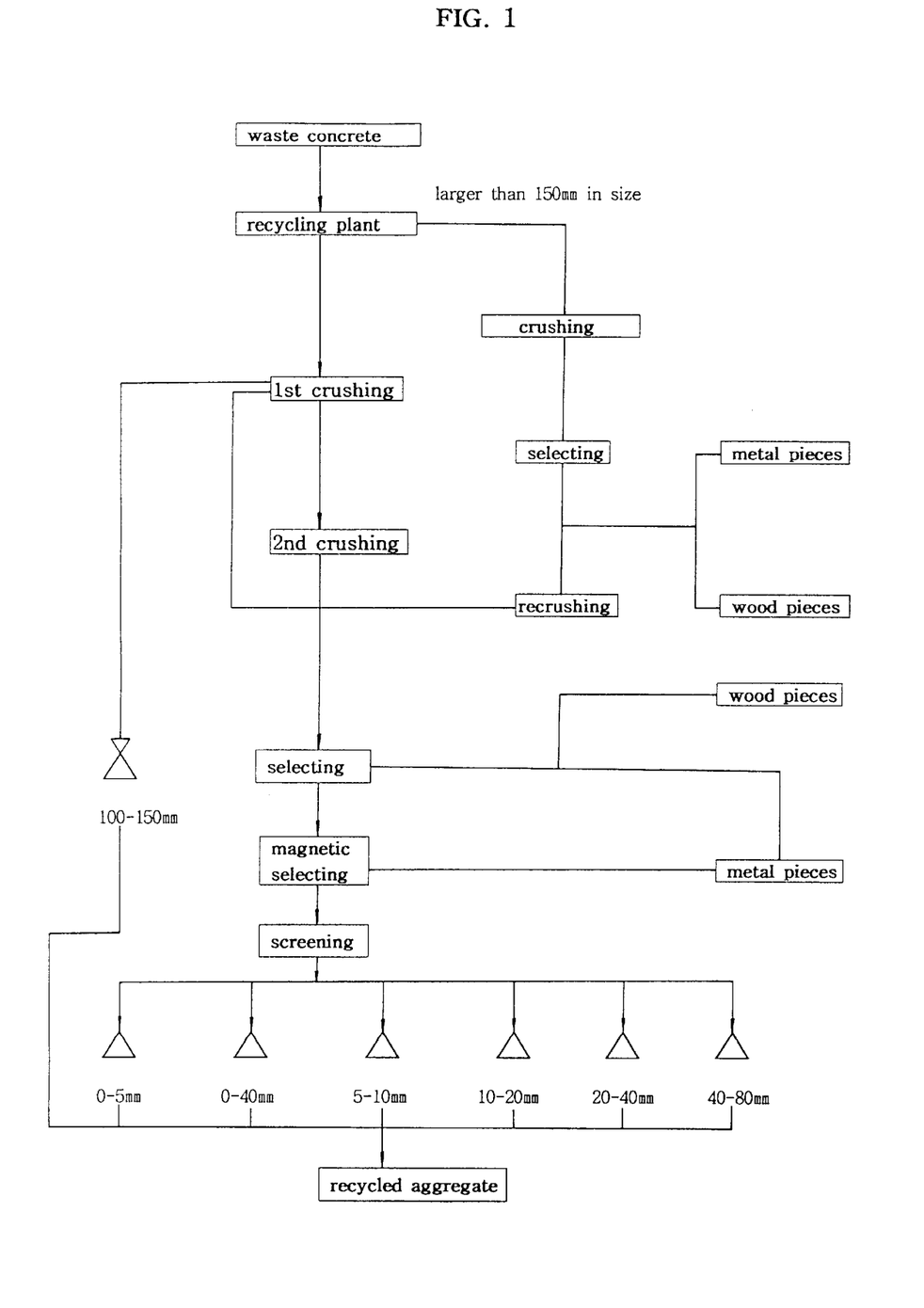
FIG. 1 is a block diagram showing a typical process of producing recycled aggregate using waste concrete.

FIG. 1 shows a typical process of producing recycled aggregate using such waste concrete. As shown in the drawing, waste concrete is primarily crushed into pieces, having appropriate sizes meeting the capacity of a crusher, prior to being processed by a recycling system. In the recycling system, the waste concrete is crushed by a jaw crusher having a capacity of 100 t/h prior to being processed through a selecting step of separating reinforcing steel pieces and waste wood from the waste concrete. The waste concrete is, thereafter, crushed by an impact crusher having a capacity of 100 t/h and is processed by a magnetic selector which finally selects reinforcing steel pieces from the waste concrete. The waste concrete from the magnetic selector is screened, thus being classified into several groups of recycled aggregate having different sizes.

However, the process of FIG. 1 is problematic in that the recycled aggregate is too rough to reutilize. Typically, the characteristics of recycled aggregate are changed in accordance with the sizes of the aggregate in a way such that specific weight and moisture absorption of the aggregate are respectively reduced and increased in inverse proportion to the size of the aggregate. The recycled aggregate, produced by the process of FIG. 1, has a small size, thus including a large amount of cement paste. Such cement paste reduces the quality of the recycled aggregate.

It is, therefore, necessary to more effectively recycle construction waste articles, such as earth, sand, waste brick, waste concrete, waste wood and waste asphalt, produced from building or public works, and to produce high quality recycled aggregate and to conserve resources.

Of course, such a recycling of construction waste articles has to be free from the generation of contaminants.

DISCLOSURE OF THE INVENTION

Accordingly, the present invention has been made keeping in mind the above problems occurring in the prior art, and an object of the present invention is to provide a method and system used for treating and recycling construction waste articles by crushing, selecting, washing, screening and forcibly returning the waste articles, thus providing high quality recycled aggregate while conserving resources and effectively preventing environmental pollution caused by such waste articles.

In order to accomplish the above object, the present invention provides a process of recycling construction waste articles, comprising the steps of: crushing the construction waste articles into primary pieces of not larger than 200 mm in size by a first jaw crusher; removing metals from the pieces using a first magnetic selector while feeding the pieces from the first jaw crusher; screening the pieces from the magnetic selector using a first surface vibrating screen, thus dividing the pieces into aggregate of not smaller than 40 mm in size and earth and sand prior to separately discharging the aggregate and earth and sand from the first surface vibrating screen using a vortex of pressurized air; washing the aggregate from the first surface vibrating screen in a water tank using a water jetting and aeration effect while allowing any floating materials to float on water in the water tank; screening the earth and sand from the first surface vibrating screen using a second surface vibrating screen, thus dividing the earth and sand into two or more groups having different sizes; forcibly feeding the water with the floating materials from the water tank to a first selection screen using a waste separation rotor, thus screening the water prior to collecting the floating materials in an impurity tank and guiding the screened water into a water recovering sedimentation tank; adding coagulant and fresh water into the sedimentation tank, thus purifying the existing water in the sedimentation tank; discharging the washed aggregate from the water tank and separating the aggregate from water using a water recovering screen; crushing the aggregate into final pieces having sizes of 45–75 mm using a second jaw crusher; removing metals from the final pieces using a second magnetic selector while feeding the final pieces from the second jaw crusher to a second selection screen; screening the final pieces using the second selection screen, thus dividing the final pieces into standard aggregate of not larger than 25 mm in size and substandard aggregate of larger than 25 mm in size; and returning the substandard aggregate from the second selection screen to a cone crusher while removing metals from the substandard aggregate using a third magnetic selector, thus recrushing the substandard aggregate.

The present invention also provides a system for recycling construction waste articles, comprising: a first crushing unit used for crushing the construction waste articles into primary pieces of not larger than 200 mm in size; a motored first feeding belt provided at an outlet end of the crushing unit and used for feeding the primary pieces, the first feeding belt being provided with both a first magnetic selector for magnetically removing metals from the primary pieces and an urethane plate for protecting the feeding belt from being impacted when the primary pieces are dropped onto the belt; a first surface vibrating screen provided at an outlet end of the first feeding belt and vibrated at a regular frequency so as to effectively screen the primary pieces, the first surface vibrating screen being provided with a perforated panel for screening the primary pieces and classifying the primary pieces into aggregate of not smaller than 40 mm in size and earth and sand, with a plurality of blowers being provided at a position under an outlet end of the screen for removing impurities from the aggregate; a water tank used for washing the aggregate from the first surface vibrating screen using a water jetting and aeration effect while allowing any floating materials to float in water; a second surface vibrating screen used for screening the earth and sand from the first surface vibrating screen, thus dividing the earth and sand into two or more groups having different sizes prior to separately discharging the earth and sand; means for forcibly feeding the water with the floating materials from the water tank to a first selection screen using a waste separation rotor, thus removing the floating materials from the water; a water recovering sedimentation tank unit receiving the water from the first selection screen, the sedimentation tank unit comprising four communicating tanks and purifying the water by adding both coagulant and fresh water; a second feeding belt provided in the water tank for discharging the aggregate from the water tank, the second feeding belt being provided with a water recovering screen for separating the aggregate from water; a second crushing unit used for crushing the aggregate from the second feeding belt into final pieces having sizes of 45–75 mm; a third feeding belt adapted for feeding the final pieces from the second crushing unit and provided with both a second magnetic selector for magnetically removing metals from the final pieces and an urethane plate for protecting the third feeding belt from being impacted when the final pieces are dropped onto the third feeding belt; a second surface vibrating screen used for screening the final pieces, thus dividing the final pieces into standard aggregate of not larger than 25 mm in size and substandard aggregate of larger than 25 mm in size, the second selection screen being provided with both a plurality of blowers and a perforated panel; a fourth feeding belt connected to the second surface vibrating screen so as to return the substandard aggregate of larger than 25 mm in size from the second surface vibrating screen, the fourth feeding belt being provided with a second magnetic selector for removing metals from the substandard aggregate; and a third crushing unit used for recrushing the returned substandard aggregate prior to feeding the recrushed aggregate to the second feeding belt.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Figure 2:
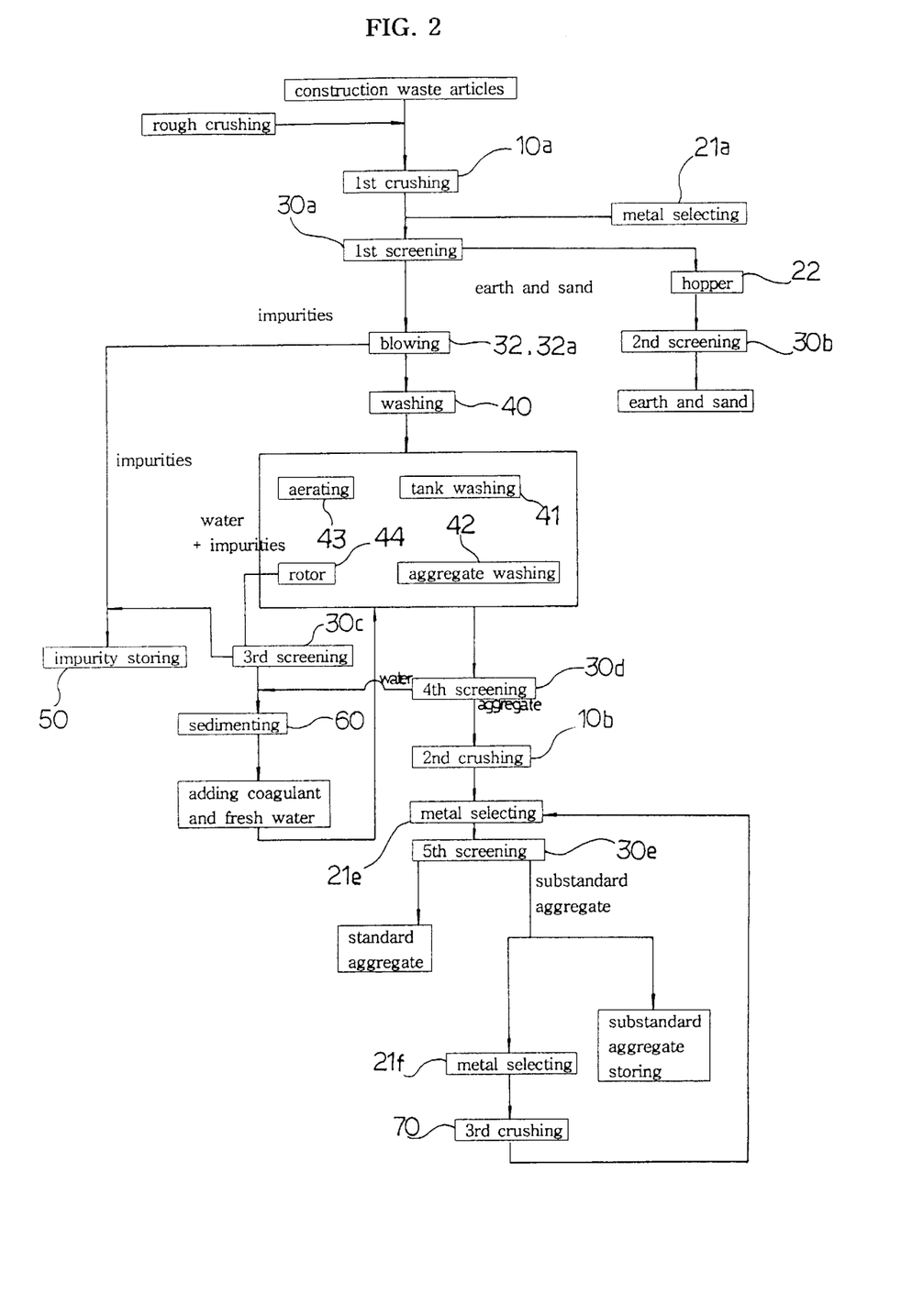
FIG. 2 is a block diagram showing a process of producing recycled aggregate using construction waste articles in accordance with the primary embodiment of the present invention.

FIG. 2 is a block diagram showing a process of producing recycled aggregate using construction waste articles in accordance with the primary embodiment of this invention.

In the process according to the primary embodiment of this invention, construction waste articles are poured into a recycling system at the first step, while recycled aggregate of 25–9 mm in size and recycled aggregate of not larger than 9 mm in size are separately discharged from the system at the last step. The process also includes a plurality of intermediate processing steps.

The intermediate processing steps are for processing earth and sand, which are separated from aggregate in the step of screening primarily crushed construction waste articles. The above intermediate processing steps are also for processing floating materials, such as waste wood, which are included in the aggregate and are removed from the aggregate by floating on water in a step of washing the aggregate.

In order to produce recycled aggregate using construction waste articles, such as earth, sand, waste concrete, waste wood and waste asphalt produced from building or public works, it is necessary to transport the construction waste articles to a recycling plant equipped with the system of this invention. Such a recycling plant is preferably located in the suburbs of a Metropolitan area.

Figure 3:
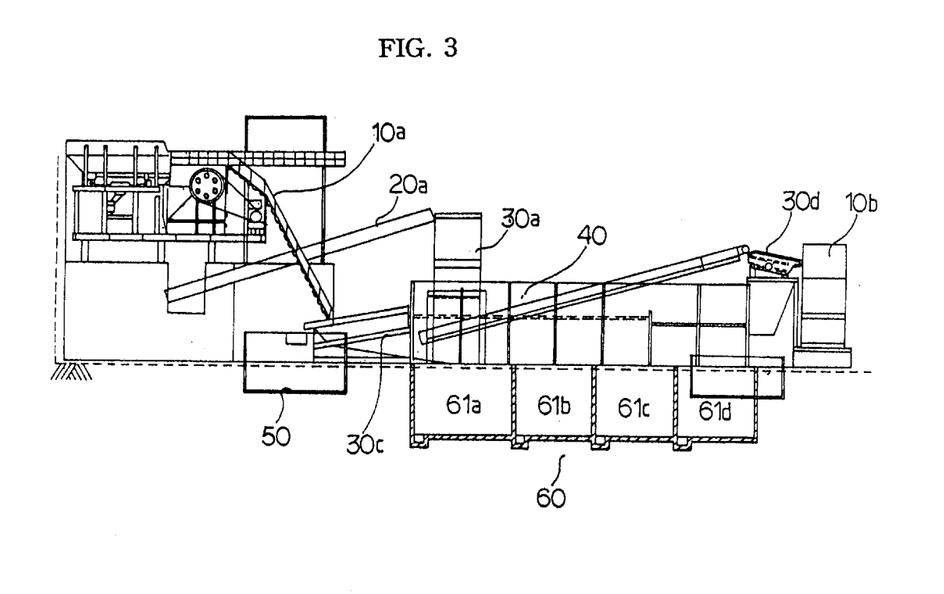
FIG. 3 is a front view showing the construction of a recycling system for producing recycled aggregate using construction waste articles in accordance with the primary embodiment of the present invention.
Figure 4:
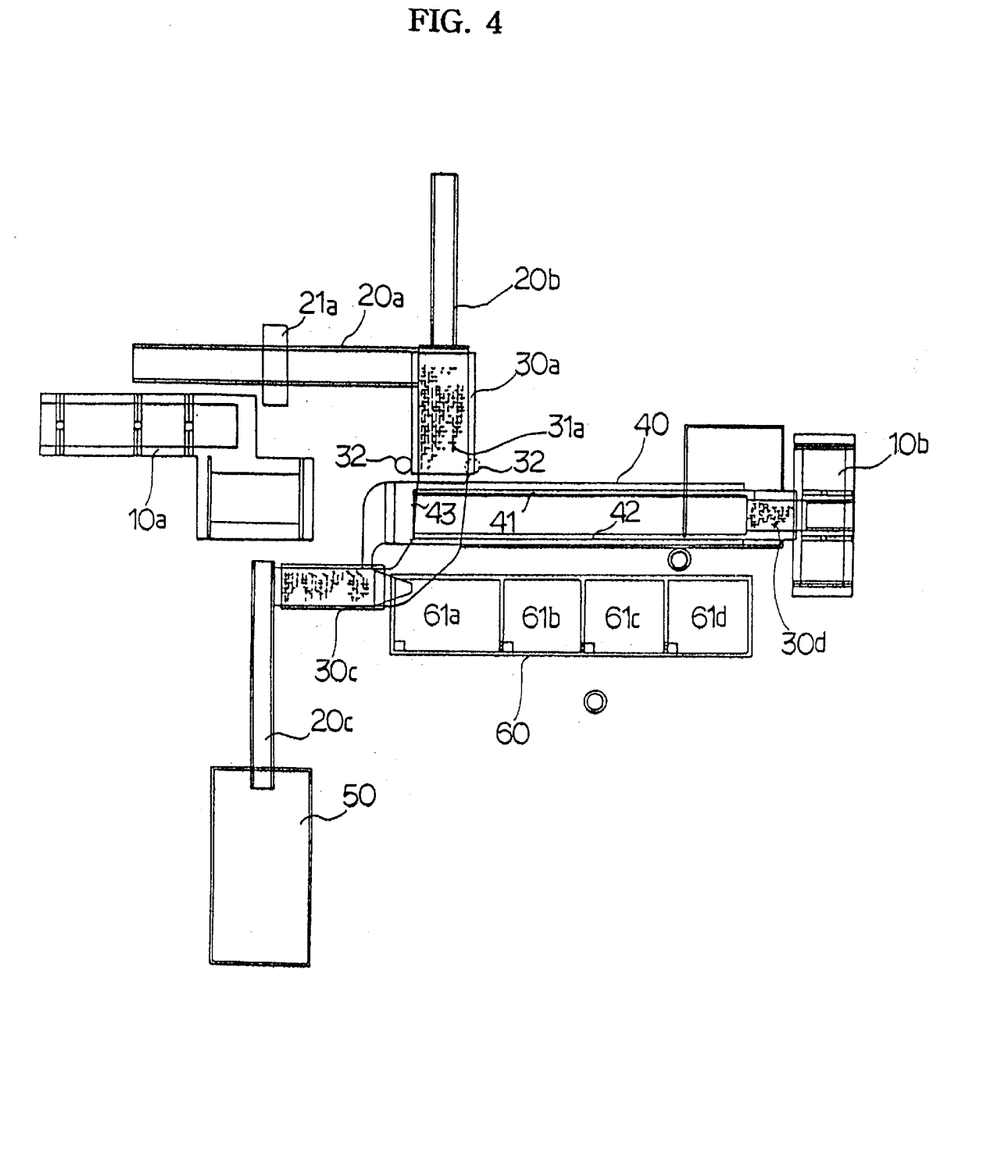
FIG. 4 is an enlarged plan view showing the position and arrangement of a waste feeding passage in the system of this invention.

FIG. 3 is a front view showing the construction of the above recycling system. FIG. 4 is an enlarged plan view showing the position and arrangement of a waste feeding passage in the above system. The above recycling system is automatically operated by a central processing unit, thus conserving labor and more effectively processing a large amount of construction waste articles in a short time.

In the process, the construction waste articles, including earth, sand, waste concrete, waste wood and waste asphalt, are directly poured into a first crushing unit without being classified. In the present invention, it is preferable to use a jaw crusher 10a as the first crushing unit.

At the first step or the primary crushing step, the construction waste articles are preferably crushed into primary pieces of not larger than 200 mm in size. However, it should be understood that the size of the primary pieces from the crushing step is not limited to the above-mentioned size.

The primary pieces from the jaw crusher 10a is, thereafter, processed by a first magnetic selector 21a, thus being separated from metals while being fed by a first feeding conveyor belt 20a. The first conveyor belt 20a is inclinedly positioned under the jaw crusher 10a, while the magnetic selector 21a is movably placed at a high position of the belt 20a and generates a high magnetic force (Gauss) enough to effectively attract and remove metals such as reinforcing steel pieces and nails from the primary pieces. A urethane panel is preferably provided at the top of the support of the conveyor belt 20a, thus protecting the belt 20a from being unexpectedly impacted when the primary pieces are dropped onto the belt 20a.

The first conveyor belt 20a is inclinedly positioned as described above with a first screening means or a first surface vibrating screen 30a being inclinedly positioned under the upper end of the conveyor belt 20a.

The first surface vibrating screen 30a is vibrated at a regular frequency by a motor and is adapted for screening the primary pieces and dividing the pieces into two groups: aggregate; and earth and sand. In order to prevent vinyl pieces, fabric pieces or wire pieces from being caught by the screen 30a, the screen 30a is preferably provided with a perforated panel 31a in place of a conventional iron net. Due to such a perforated panel 31a, the screen 30a is usable for a lengthy period of time and reduces maintenance cost. The screen 30a is also provided with a guide wall at both side edges, thus preventing the aggregate from being unexpectedly dropped from the screen 30a when the primary pieces are screened. The above screen 30a separates aggregate of not smaller than 40 mm in size from earth and sand.

A water tank 40, made of a hard rubber, is horizontally positioned under the first surface vibrating screen 30a in such a manner that the aggregate from the screen 30a is directly dropped into the tank 40. In order to allow the aggregate to be uniformly spread while being dropped into the water tank 40, a plurality of blowers 32 and 32a are arranged at both corners of the lower end of the perforated panel 31a. In the system of this invention, the blowers 32 and 32a individually have a rectangular duct, which is four or five times as wide as a conventional duct of a typical conveyor belt-type recycling system and is positioned under the outlet end of the perforated panel 31a. Therefore, the duct of the blowers 32 and 32a may fail to uniformly output a pressurized air current. However, such a problem caused by the wider ducts can be effectively overcome by alternately arranging the blowers 32 and 32a. Such an alternate arrangement of the blowers 32 and 32a generates a vortex of pressurized air from the ducts, thus making the pressurized air current from the ducts uniform and constant. The above vortex of the pressurized air current is effectively guided to the air outlet points of the ducts, thus effectively discharging the aggregate from the perforated panel 31a.

Figure 5:
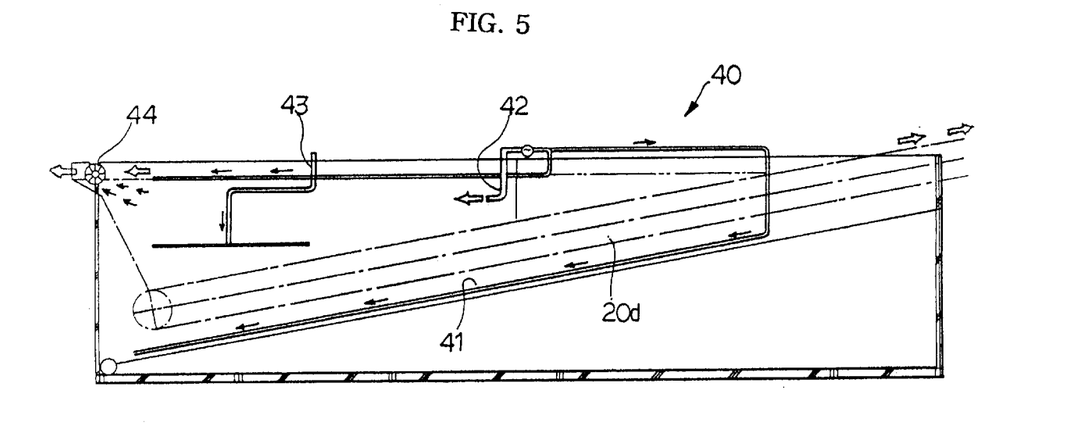
FIG. 5 is a sectional view showing the internal construction of a water tank included in the recycling system of this invention.

FIG. 5 is a sectional view showing the internal construction of the water tank 40. As shown in FIGS. 4 and 5, the water tank 40, which is used for washing the aggregate from the first screen 30a and removing floating materials from the aggregate, has an inclined bottom with the deeper end being positioned under the screen 30a. The tank 40 also includes two types of water nozzles: a tank washing nozzle 41 and a plurality of aggregate washing nozzles 42. The tank washing nozzle 41 is positioned in the tank 40 and is used for washing the interior of the tank 40. The aggregate washing nozzles 42 are used for washing the aggregate in the tank 40. The water tank 40 also includes an aerator 43, which bubbles air through water and causes floating materials to float on the water.

In a detailed description, the tank washing nozzle 41 is arranged in the tank 40 in a way such that it discharges pressurized water from the upper to the lower portion of the tank 40, thus forcibly and effectively removing sludge from the inside wall of the tank 40. The aggregate washing nozzles 42 are arranged at the upper portion of the tank 40 along with a plurality of, preferably, five sets of water spraying devices and discharges a large amount of highly pressurized water, thus forming a forcible water circulation in the tank 40. Such a forcible water circulation effectively washes the aggregate and forces the floating materials on the water to flow to a water recovering passage provided at the rear end of the tank 40.

On the other hand, the aerator 43 is arranged at the outside of the tank 40 and generates pressurized air which is fed to the interior bottom of the tank 40 through a pipe. The pressurized air forms air bubbles in water and effectively washes the aggregate in the tank 40 by aeration effect. In addition, such an aeration effect maximizes the floating force of water in the tank 40, thus forcing light impurities to float on the water and making the aggregate free from such floating impurities.

In the present invention, the pressurized air nozzles, which are formed on the pipe extending from the aerator 43 and are arranged on the interior bottom of the tank 40, preferably and individually have a diameter of about 3 mm. The number of such pressurized air nozzles of the aerator 43 is determined in accordance with required capacity of the aerator 43.

Figure 6:
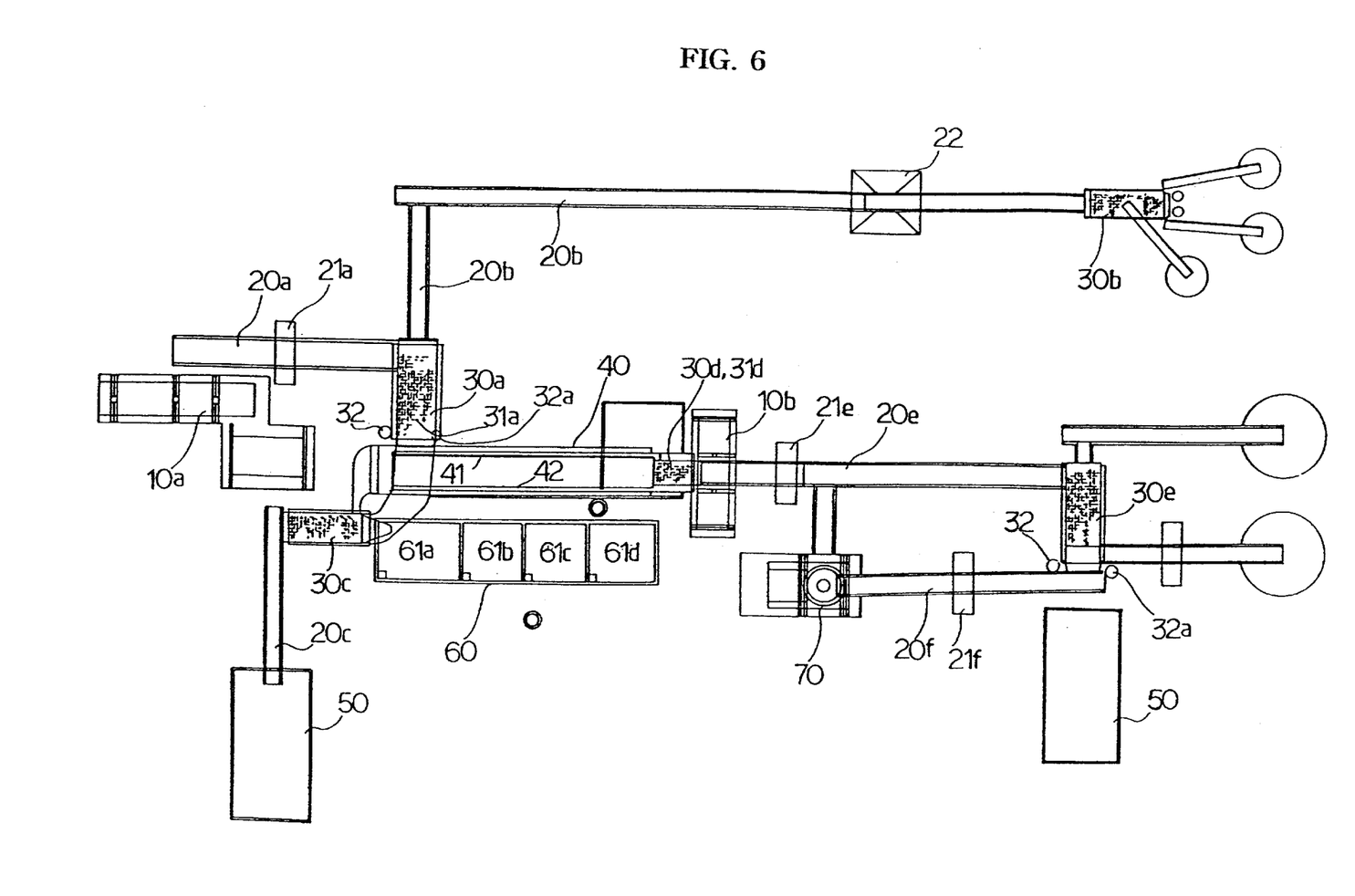
FIG. 6 is a front view showing the construction of a recycling system used for producing recycled aggregate using construction waste articles and additionally provided with a plurality of intermediate steps in accordance with the second embodiment of the present invention.

FIG. 6 is a front view showing the construction of a recycling system in accordance with the second embodiment of the present invention. In the second embodiment, a plurality of intermediate processing steps are added to the process of the primary embodiment. That is, the earth and sand, which are separated from the aggregate by the perforated panel 31a of the first surface vibrating screen 30a, are fed to a second surface vibrating screen 30b by a second conveyor belt 20b which is longitudinally arranged under the perforated panel 31a. In the system of the second embodiment, it is preferable to provide a hopper 22 at a middle position of the conveyor belt 20b so as to mix new earth and sand, which are not obtained from the process of this invention, but are processed by an additional process, with the existing earth and sand on the conveyor belt 20b. The second screen 30b screens the earth and sand, thus dividing the earth and sand into two or more groups having different sizes prior to separately discharging the earth and sand from the system.

As best seen in FIG. 5, a waste separation rotor 44 is positioned at the water recovering passage of the water tank 40. The above rotor 44 forcibly discharges the floating impurities, such as waste wood and/or waste resin materials, from the tank 40 into an impurity collection tank 50 outside the water tank 40. The waste separation rotor 44 is operated as a Conventional hydraulic turbine. That is, the above rotor 44 has a highly vibrated rotating force capable of effectively drawing water laden with floating impurities from the water tank 40.

Water with floating impurities from the water tank 40 is dropped onto a first selection screen 30c, thus being screened and separated from the impurities. The first selection screen 30c comprises a perforated panel in the same manner as that described for the first surface vibrating screens 30a. The floating impurities from the first selection screen 30c are, thereafter, fed to an impurity tank 50 through a conveyor belt 20c prior to being discharged from the system, while the screened water, free from floating impurities, is guided to a water recovering sedimentation tank unit 60.

In the above system, it is preferable to build the water recovering sedimentation tank unit 60 underground. The sedimentation tank unit 60 comprises four or more sedimentation tanks 61a, 61b, 61c and 61d through which the recovered water passes in order. The above sedimentation tanks 61a to 61d communicate with each other through pipes extending at the lower portions of the tanks 61a to 61d.

Sludge, which is deposited in the tanks 61a to 61d and includes rich organic components, is appropriately discharged, processed and recycled in accordance with specified regulations.

Water in the sedimentation tank unit 60 is more effectively purified by an addition of both a high molecular coagulant and fresh water into the tank unit 60.

The fresh water may be underground water which is pumped up and added into the tank unit 60. In the present invention, it is preferable to use aluminum sulfate $[Al_2(SO_4)_3]$ or ferric sulfate $[Fe_2(SO_4)_3]$ as the high molecular coagulant. Such coagulant allows water to be gradually purified and more effectively recycled. Such a recycling of water is due to the inorganic composition of the construction waste articles, causing the water to have relatively simple characteristics. Of course, the selected coagulant has to meet legal regulations.

In the sedimentation tank unit 60, water is finally processed at the last tank 61d prior to being pumped up by a high pressure motor. The purified water is, thereafter, fed to the water tank 40 through a return pipe, thus being recirculated for washing aggregate in the system of this invention.

In the washing tank 40, a conveyor belt 20d is arranged along the inclined bottom of the tank 40, thus feeding the washed aggregate so as to discharge the aggregate to the outside of the tank 40. In order to stably feed the aggregate in the tank 40, it is preferable to operate the belt 20d at a low feeding velocity. Provided at the outlet end of the above belt 20d is a water recovering screen 30d, which separates the aggregate from water. Due to the above screen 30d, it is possible to prevent water from being unexpectedly introduced into the next steps and causing operational errors of the system. The water recovering screen 30d has provisions to vibrate its surface in the same manner as that described for the above-mentioned screens.

The aggregate from the water tank 40 is dropped on a second crushing unit or a second jaw crusher 10b, thus being crushed into final pieces having sizes of 45–75 mm. The final pieces are fed from the second jaw crusher 10b to a second selection screen 30e through a conveyor belt 20e. In the same manner as that described for both the first conveyor belt 20a and the first surface vibrating screen 30a, the conveyor belt 20e is inclinedly positioned under the second jaw crusher 10b with the second selection screen 30e being inclinedly positioned under the upper end of the conveyor belt 20b. A magnetic selector 21e is movably placed at a high position of the belt 20e and generates a high magnetic force enough to effectively attract and remove remaining metals from the final pieces.

In addition, a plurality of blowers 32 and 32a are arranged at both corners of the lower end of the screen's perforated panel 31e, thus generating a vortex of pressurized air and allowing the aggregate to be effectively discharged from the perforated panel 31e.

At the second selection screen 30e, the final pieces are divided into standard recycled aggregate of not larger than 25 mm in size and substandard recycled aggregate of larger than 25 mm in size. Thereafter, standard aggregate of 25–9 mm in size and standard aggregate of not larger than 9 mm in size are separately discharged from the system. In order to separately discharge the standard aggregate from the system, conveyor belts and magnetic selectors may be added to the system. In this case, the diameter of each perforated hole of the screen 30e may be determined in accordance with a use of the recycled aggregate.

The substandard aggregate of larger than 25 mm in size from the second selection screen 30e is forcibly returned to a third crushing unit or a cone crusher 70 so as to be recrushed. In order to return the substandard aggregate to the cone crusher 70, a conveyor belt 20f is inclinedly positioned under the outlet end of the screen 30e. A magnetic selector 21f is movably placed at a high position of the belt 20f and generates a high magnetic force enough to almost completely remove remaining metals from the returned aggregate. The above cone crusher 70 recrushes the returned aggregate using a frictional rotating force in the same manner as a traditional millstone, thus improving both the configuration and the consume resistance of the aggregate. However, such a cone crusher 70 may seriously break down due to small steel pieces, nails or steel wires included in the returned aggregate. Therefore, such steel pieces, nails and steel wires have to be almost completely removed from the returned aggregate by the magnetic selector 21f when the substandard aggregate is returned to the cone crusher 70 through the conveyor belt 20f. It is thus possible to prevent unexpected breakage of the cone crusher 70 and remarkably improve quality of the recrushed aggregate.

The recrushed aggregate from the cone crusher 70 is fed to the conveyor belt 20e, thus being processed by the second selection screen 30. In the present invention, it should be understood that the system may be designed to directly feed the substandard aggregate of larger than 25 mm in size from the screen 30e to a container 50 without processing them by the cone crusher 70.

An impact crusher may be substituted for the above cone crusher 70. However, it is preferable to use a cone crusher in place of an impact crusher since such a cone crusher more effectively resists against abrasion, reduces management cost, conserves time and has a high operational effect.

In the above preferred embodiments, the rotating force for the movable parts of the recycling system is generated by an electric motor. However, the movable parts of the system may be operated by hydraulic motors in place of electric motors without affecting the functioning of this invention. In addition, the system may use a trailer or a caterpillar for selectively moving the parts in a recycling plant.

INDUSTRIAL APPLICABILITY

As described above, the present invention provides a method and system for stably and continuously producing high quality recycled aggregate using construction waste articles. The method and system of this invention reduces production cost of the recycled aggregate while conserving resources and preventing environmental pollution caused by such waste articles. The operational effect of the method and system of this invention was experimentally measured as follows.

When typical construction waste articles are processed by the system of this invention, the system produces recycled sand of −6 mm in size, recycled sand of −9 mm in size, recycled pebbles of −25 mm in size and earth and sand as will be shown in the following chart I.

Chart I: yield of recycled construction waste articles

As a result of the experimental operation of the system, recycled aggregate comprises 30% of earth and sand, 35% of −25 mm pebbles, 20% of −9 mm sand and 15% of −6 mm sand. The capacity of the system of this invention is 200 m³/h and so when the system is operated for 8 hours for day, the amount of recycled aggregate produced by the system is shown in the following chart II.

Chart II: production per day

As shown in the above chart II, when 1,600 m³ of construction waste articles are processed by the system of this invention in a day, the system produces recycled aggregate including 560 m³ of −25 mm pebbles, 320 m³ of −9 mm sand, 240 m³ of −6 mm sand and 480 m³ of earth and sand.

Of the above recycled aggregate, earth and sand, which have a low effective value as recycled aggregate, are mainly used as a material for raising the ground or reclaiming land. Therefore, when the earth and sand are excepted from the production per day, the total amount of effective recycled aggregate produced by the system in a day reaches 1,120 m³.

Of the effective recycled aggregate, the −25 mm pebbles may be effectively used as a covering material in a road repairing work or a filler of a breast wall. The −9 mm sand may be effectively used as a material in making brick, block or guide block of street. On the other hand, the −6 mm sand may be effectively used as a filler of a piping work or a material of concrete production.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

I claim:

1. A process of recycling construction waste articles, comprising the steps of:

crushing the construction waste articles into primary pieces of not larger than 200 mm in size by a first jaw crusher;

removing metals from said pieces using a first magnetic selector while feeding the pieces from the first jaw crusher;

screening the pieces from said magnetic selector using a first surface vibrating screen, thus dividing the pieces into aggregate of not smaller than 40 mm in size and earth and sand prior to separately discharging the aggregate and earth and sand from the first surface vibrating screen using a vortex of pressurized air;

washing the aggregate from the first surface vibrating screen in a water tank using a water jetting and aeration effect while allowing any floating materials to float on water in the water tank;

screening the earth and sand from the first surface vibrating screen using a second surface vibrating screen, thus dividing the earth and sand into two or more groups having different sizes;

forcibly feeding the water with the floating materials from the water tank to a first selection screen using a waste separation rotor, thus screening the water prior to collecting the floating materials in an impurity tank and guiding the screened water into a water recovering sedimentation tank;

adding coagulant and fresh water into said sedimentation tank, thus purifying the existing water in the sedimentation tank;

discharging the washed aggregate from said water tank and separating the aggregate from water using a water recovering screen;

crushing the aggregate into final pieces having sizes of 45–75 mm using a second jaw crusher;

removing metals from said final pieces using a second magnetic selector while feeding the final pieces from the second jaw crusher to a second selection screen;

screening the final pieces using the second selection screen, thus dividing the final pieces into standard aggregate of not larger than 25 mm in size and substandard aggregate of larger than 25 mm in size; and returning the substandard aggregate from the second selection screen to a cone crusher while removing metals from said substandard aggregate using a third magnetic selector, thus recrushing the substandard aggregate.

2. A system for recycling construction waste articles, comprising:

a first crushing unit used for crushing the construction waste articles into primary pieces of not larger than 200 mm in size;

a motored first feeding belt provided at an outlet end of the crushing unit and used for feeding the primary pieces, said first feeding belt being provided with both a first magnetic selector for magnetically removing metals from the primary pieces and an urethane plate for protecting the feeding belt from being impacted when the primary pieces are dropped onto the belt;

a first surface vibrating screen provided at an outlet end of the first feeding belt and vibrated at a regular frequency so as to effectively screen the primary pieces, said first surface vibrating screen being provided with a perforated panel for screening the primary pieces and classifying the primary pieces into aggregate of not smaller than 40 mm in size and earth and sand, with a plurality of blowers being provided at a position under an outlet end of the screen for removing impurities from the aggregate;

a water tank used for washing the aggregate from the first surface vibrating screen using a water jetting and aeration effect while allowing any floating materials to float in water;

a second surface vibrating screen used for screening the earth and sand from the first surface vibrating screen, thus dividing the earth and sand into two or more groups having different sizes prior to separately discharging the earth and sand;

means for forcibly feeding the water with the floating materials from the water tank to a first selection screen using a waste separation rotor, thus removing the floating materials from the water;

a water recovering sedimentation tank unit receiving the water from the first selection screen, said sedimentation tank unit comprising four communicating tanks and purifying the water by adding both coagulant and fresh water;

a second feeding belt provided in said water tank for discharging the aggregate from the water tank, said second feeding belt being provided with a water recovering screen for separating the aggregate from water;

a second crushing unit used for crushing the aggregate from the second feeding belt into final pieces having sizes of 45–75 mm;

a third feeding belt adapted for feeding the final pieces from the second crushing unit and provided with both a second magnetic selector for magnetically removing metals from the final pieces and an urethane plate for protecting the third feeding belt from being impacted when the final pieces are dropped onto the third feeding belt;

a second surface vibrating screen used for screening the final pieces, thus dividing the final pieces into standard aggregate of not larger than 25 mm in size and substandard aggregate of larger than 25 mm in size, said second selection screen being provided with both a plurality of blowers and a perforated panel;

a fourth feeding belt connected to said second surface vibrating screen so as to return the substandard aggregate of larger than 25 mm in size from the second surface vibrating screen, said fourth feeding belt being provided with a second magnetic selector for removing metals from the substandard aggregate; and a third crushing unit used for recrushing the returned substandard aggregate prior to feeding the recrushed aggregate to the second feeding belt.

* * * * *